Aug. 18, 1942.  C. G. JOHN  2,293,141
BEAN SNIPPING AND CUTTING MACHINE
Filed July 20, 1940   7 Sheets-Sheet 1
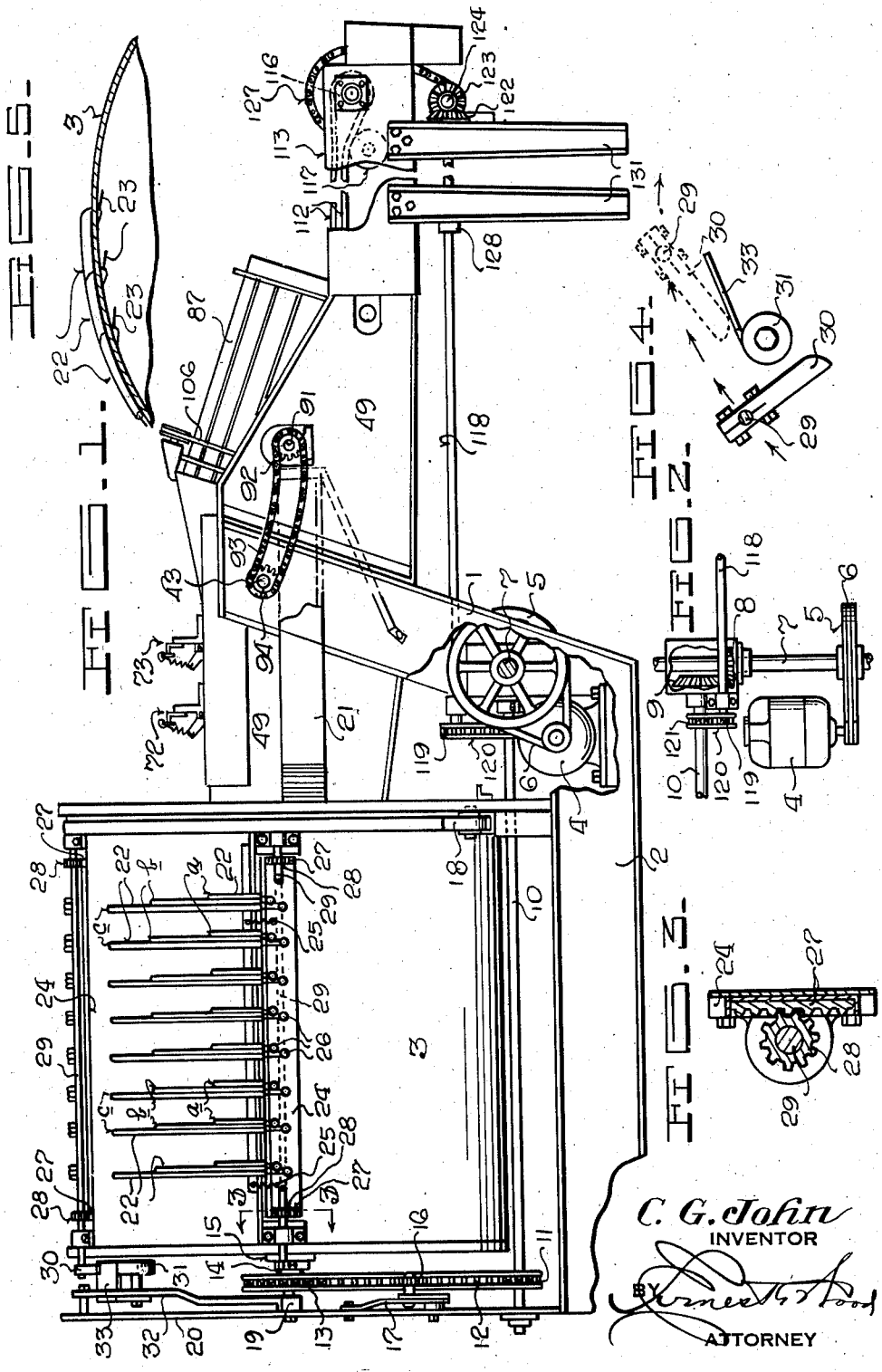
C. G. John
INVENTOR
ATTORNEY Aug. 18, 1942.  C. G. JOHN  2,293,141
BEAN SNIPPING AND CUTTING MACHINE
Filed July 20, 1940   7 Sheets-Sheet 2
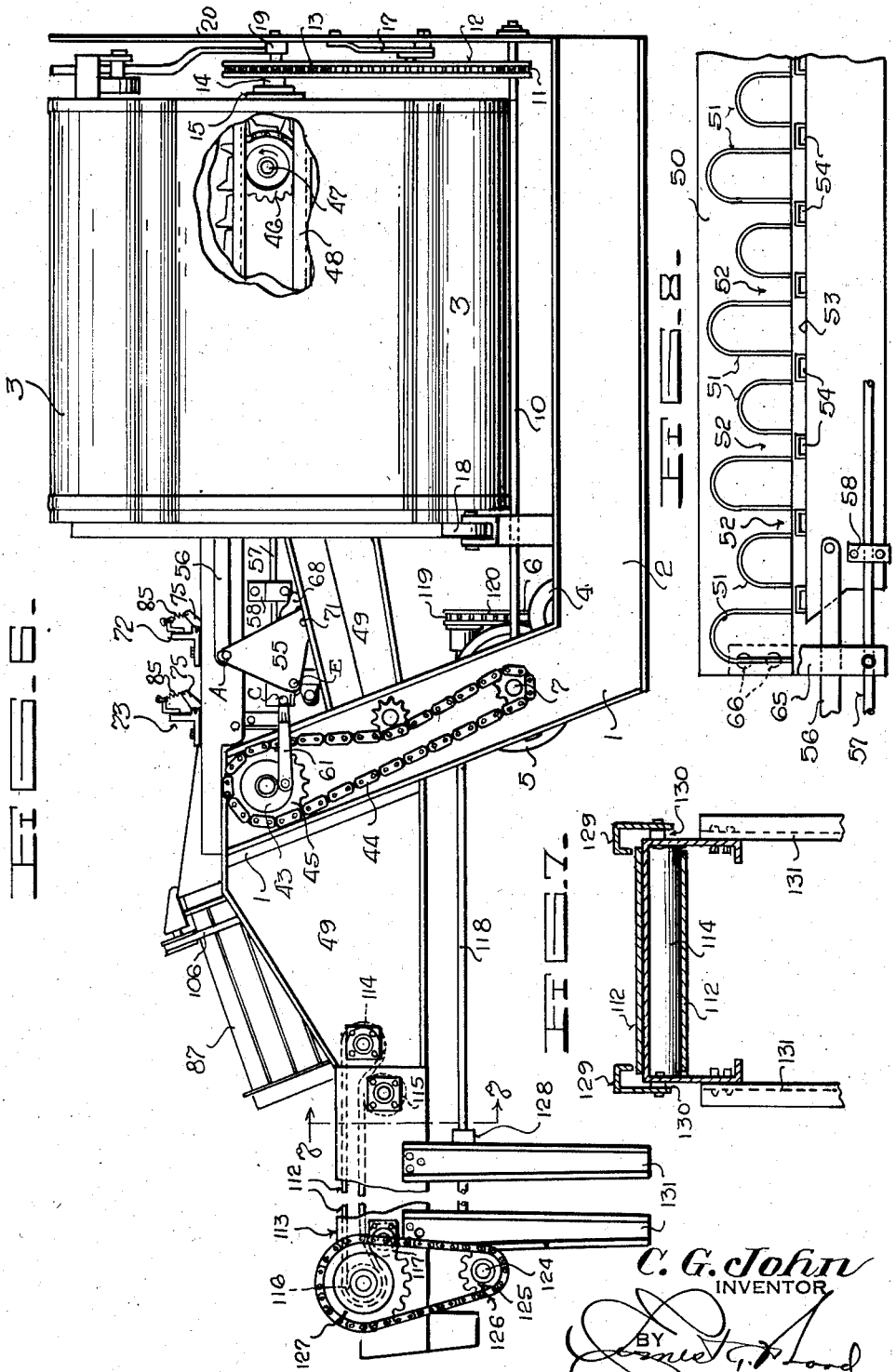

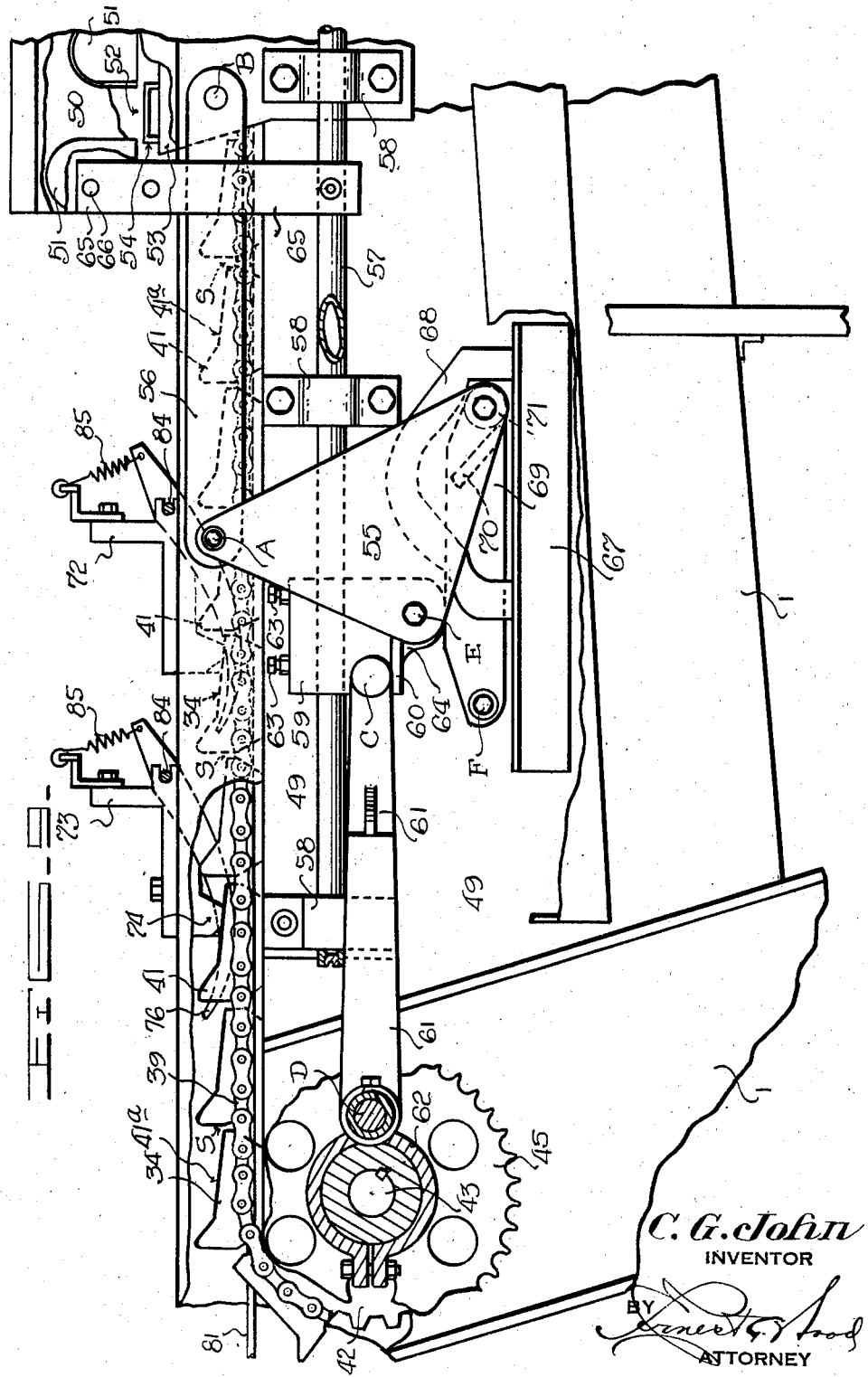

Aug. 18, 1942.   C. G. JOHN   2,293,141
BEAN SNIPPING AND CUTTING MACHINE
Filed July 20, 1940   7 Sheets-Sheet 4
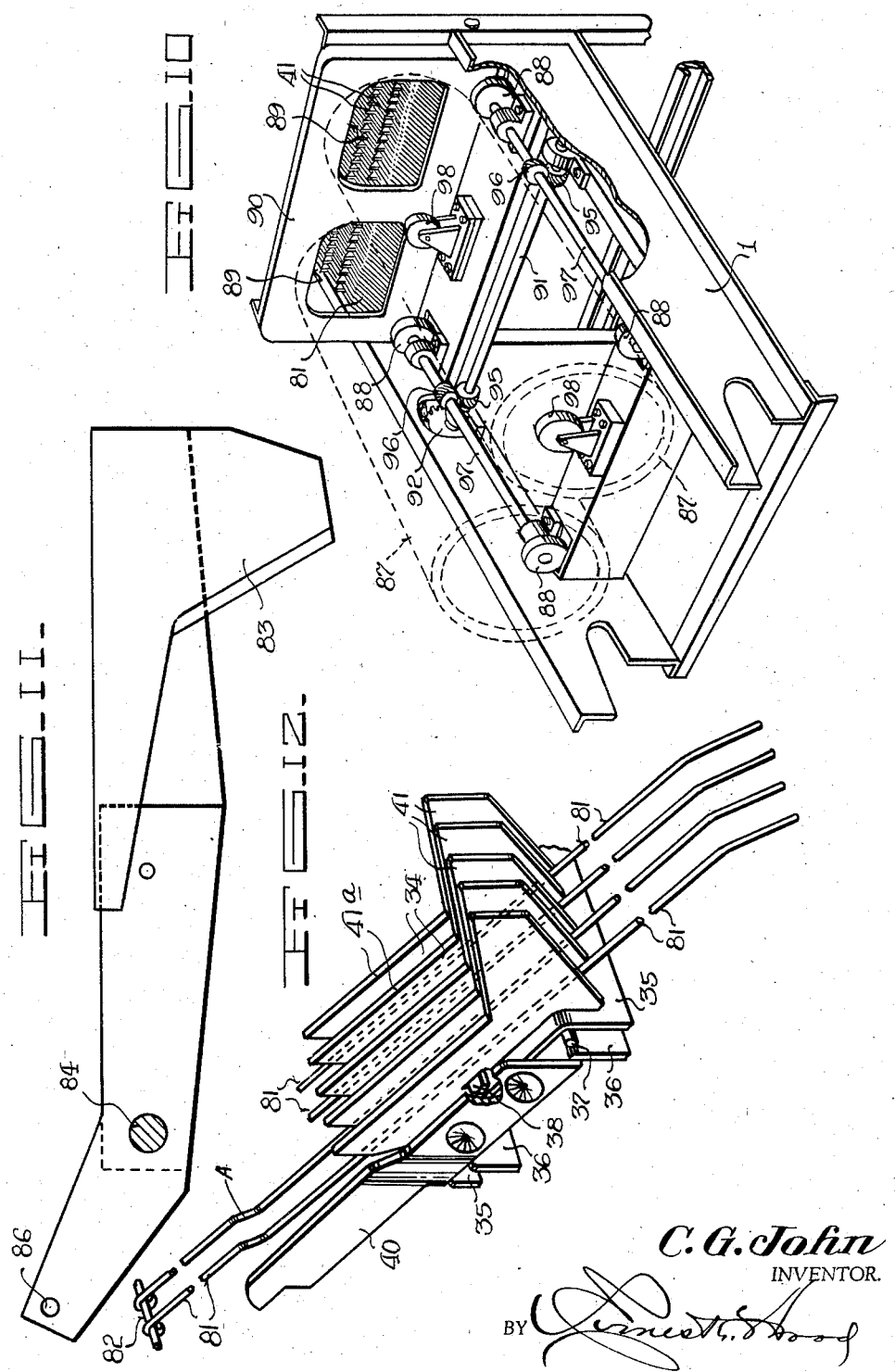
C. G. John
INVENTOR.
BY
ATTORNEY.

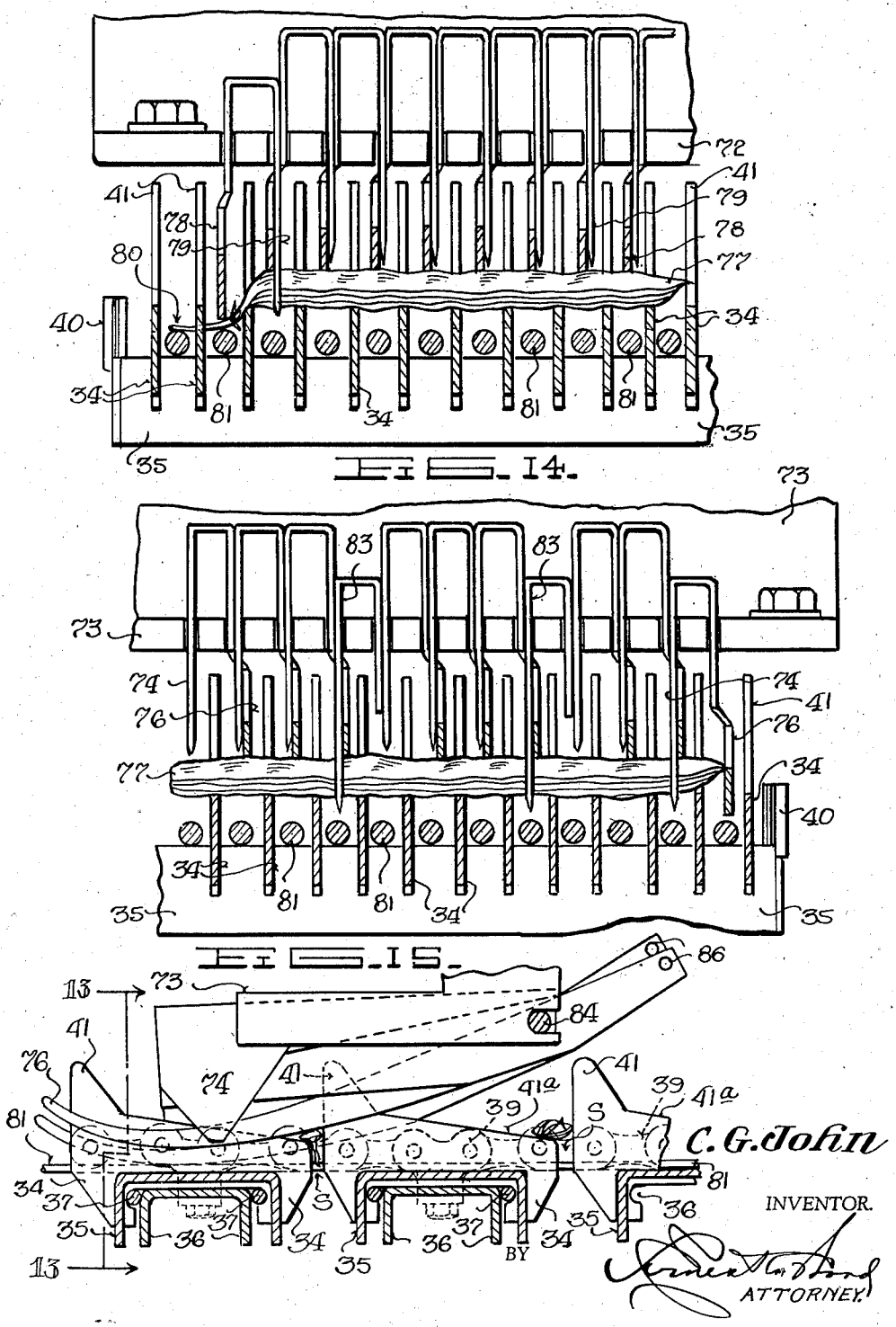

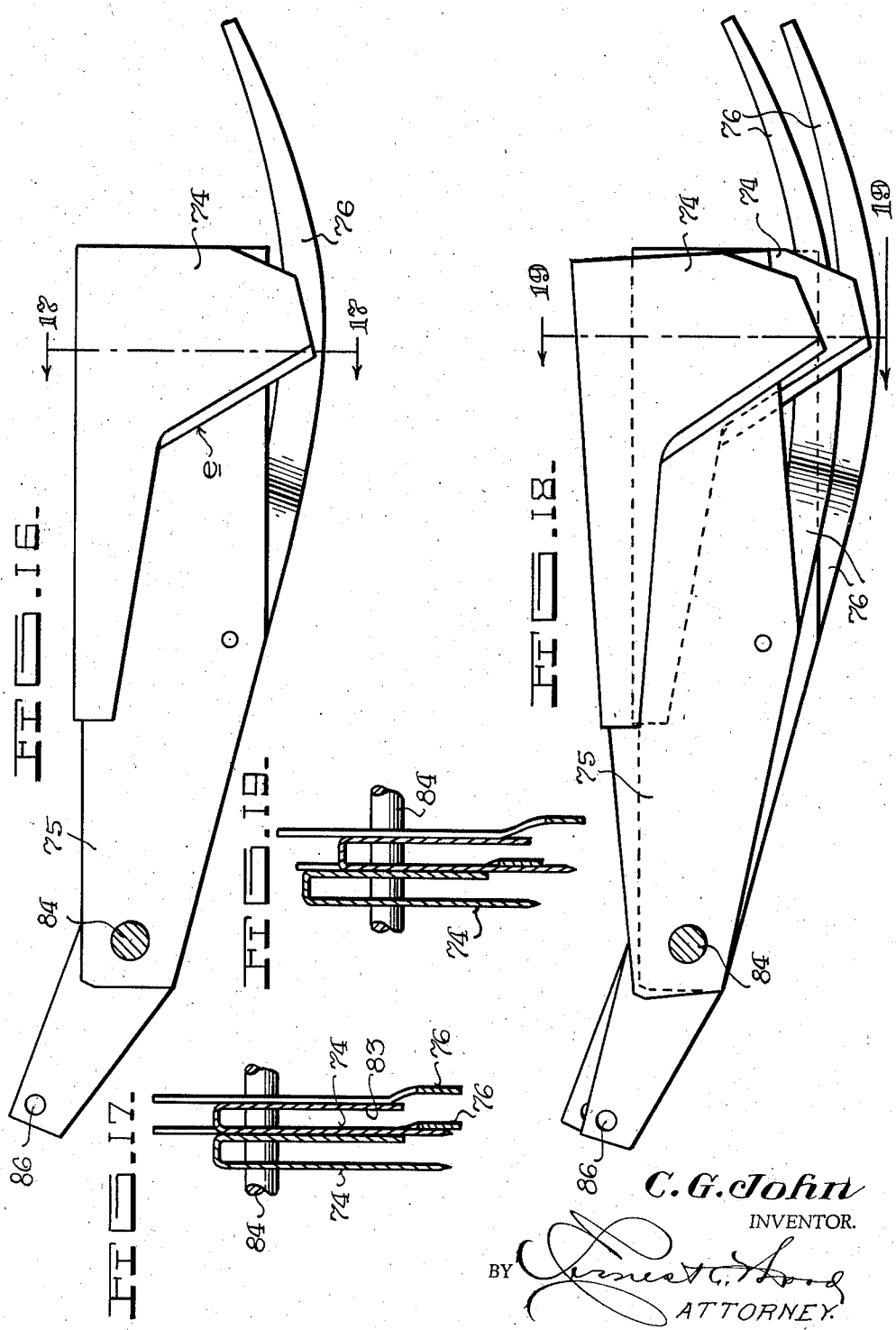

Aug. 18, 1942. C. G. JOHN 2,293,141
BEAN SNIPPING AND CUTTING MACHINE
Filed July 20, 1940 7 Sheets-Sheet 7
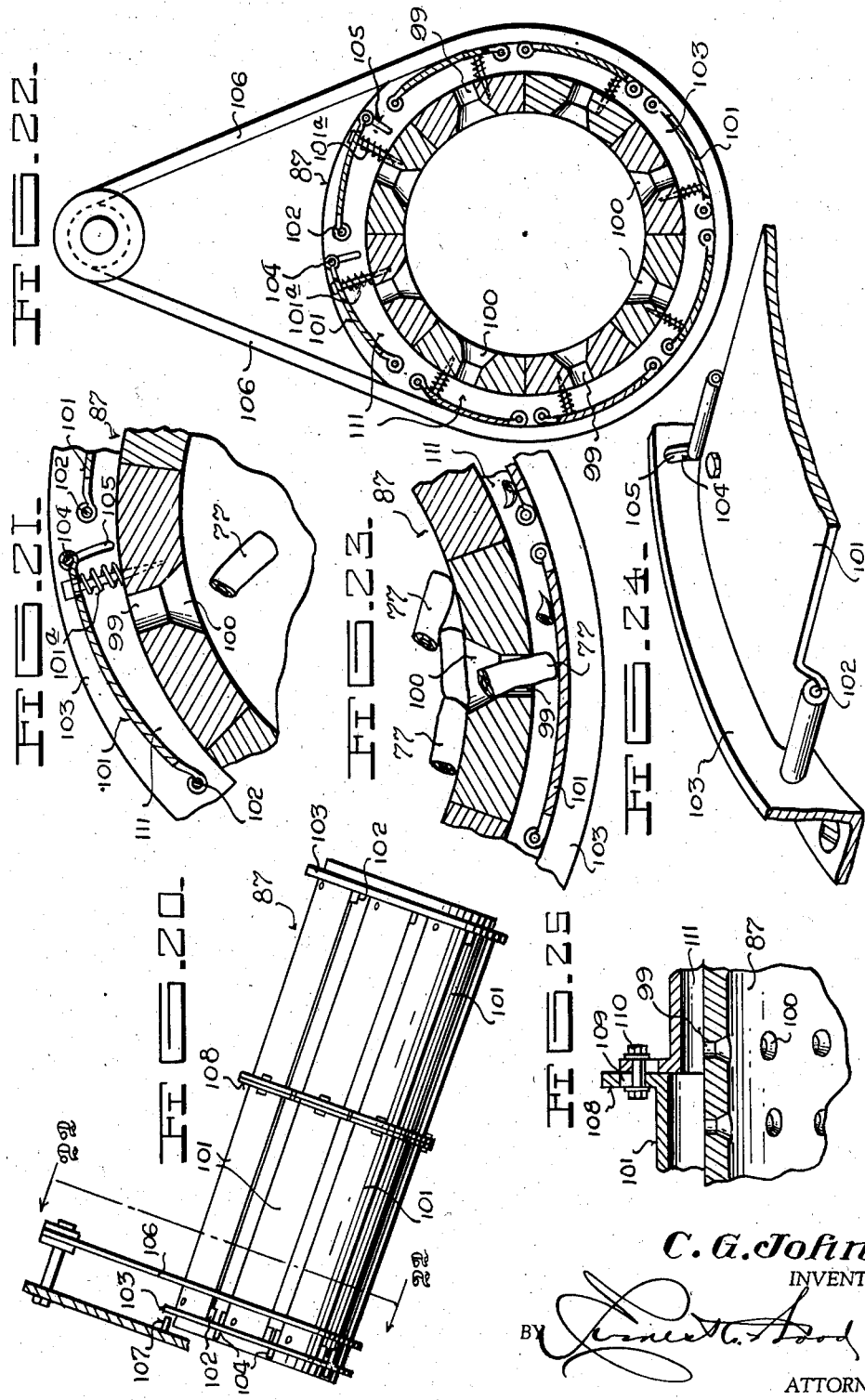
C. G. John
INVENTOR.
BY 
ATTORNEY.

Patented Aug. 18, 1942

2,293,141

UNITED STATES PATENT OFFICE 2,293,141

BEAN SNIPPING AND CUTTING MACHINE

Chaucer G. John, Dallas, Tex.

Application July 20, 1940, Serial No. 346,491

8 Claims. (Cl. 146—86)

This invention relates to a machine for snipping and cutting green beans and other legumes for canning and it has particular reference to certain new and useful improvements in cutting and slicing mechanism and means for elevating and conveying the commodity into effective range of said cutting and slicing means.

The principal object of the present invention is to provide a machine of the kind specified, growing out of U. S. Letters Patent No. 1,927,345, issued to the applicant herein, in which such improvements have been made as to obtain maximum efficiency particularly in the cutting and snipping mechanism to insure the highest degree of effectiveness possible.

Another object of the invention is to provide a novel means for elevating beans as well as a novel means in the form of a distributor whose function is to assemble the beans into a dispersed end to end relationship transversely across an endless conveyor for subjection to the action of the cutting and snipping means.

Another and highly important object of the invention resides in the peculiar construction of knives and guards, these being so related, one unit with the other that only an end of a bean may be cut off, (and others so arranged that the opposite end of the bean as well as the body thereof severed, the latter in sections of a predetermined length.) The bean itself determines the resultant cutting effect of the knives by acting on the guards in the course of its travel thereunder.

Another object of the invention is to provide means operative subsequent to the action of the knives to separate the severed ends of the beans from the sectionized bodies, causing them to report at different points for disposal.

Yet another object of the present invention is to provide an elongated picking table operating in conjunction with the machine, which provides for manual separation of undesirable particles from the severed mass of beans, the latter continuing on to a receiver for transportation to a point for ultimate disposition.

With the foregoing objects as paramount, the invention has further and lesser objects in view as well as certain salient features of construction and arrangement of parts to become manifest as the description proceeds, taken in connection with the accompanying drawings, wherein:

Figure 1 is a side elevational view of a machine constructed according to the present invention.

Figure 2 is a fragmentary detail view of the drum, conveyor and picker belt driving means.

Figure 3 is a fragmentary view of the means for manipulating the bean impaling and elevating means in the drum, taken on line 3—3 on Figure 1.

Figure 4 is a detail view of the actuating arm for the element shown in Figure 3.

Figure 5 is a fragmentary view of the drum, showing one position of one group of impaling needles.

Figure 6 is an elevational view of the machine opposite that shown in Figure 1.

Figure 7 is a vertical sectional view of the picker table on line 7—7 on Figure 6.

Figure 8 is a side elevational view of the bean distributing and assembling device, reciprocably operating axially in the drum and initially receiving beans released by the impaling needles of the drum.

Figure 9 is an enlarged fragmentary view of the cam actuated means for effecting reciprocation of the distributing and assembling means shown in Figure 8.

Figure 10 is a perspective view of the supporting frame or mounting for the sifter or devices for separating ends and stems from the sectionized bodies of the beans, the actual sifters being shown in dotted lines.

Figure 11 is a side elevational view of one of the cutting knives without a guard.

Figure 12 is a detail perspective view of a series of the plates constituting a part of the endless conveyor and disposed intermediate the knives.

Figure 13 is a fragmentary view, partly in section, on line 13—13 on Fig. 15 of one bank of knives employed solely for severing one end of the bean and illustrating the disposition of the stem or flower end thereof.

Figure 14 is a view similar to Figure 13 but showing a companion bank of knives and the manner of cutting the opposite end of the bean as well as sectionizing the bean.

Figure 15 is a side elevational view of one of the knives, showing its relationship with the plates of the conveyor, the latter being fragmentarily shown.

Figure 16 is a side elevational view of knife and guard units from the bank fragmentarily shown in Figure 14 or right hand bank.

Figure 17 is a vertical section on line 17—17 on Figure 16.

Figure 18 is a view similar to Figure 16 but showing one unit in displaced relation to another, illustrating the interlocked relationship thereof.

Figure 19 is a vertical section on line 19—19 on Figure 18.

Figure 20 is a detail view of one of the sifter units into which the mass is discharged by the endless conveyor subsequent to the snipping and slicing operation.

Figure 21 is a fragmentary detail view of the sifter showing the manner of holding bean sections against discharge with the severed ends.

Figure 22 is a transverse section on line 22—22 on Figure 20.

Figure 23 is another fragmentary view of the sifter, similar to Figure 21, showing release of the severed bean tips but retention of the sectionized body.

Figure 24 is a fragmentary detail view of one of the relatively spaced control plates longitudinally disposed about the body of each sifter to determine release of particles therefrom, and Figure 25 is a fragmentary detail view of the means by which the control plates may be relatively adjusted to vary the space between the periphery of the sifter cylinder and plates to accordingly vary the length of the particles released from or retained in the cylinder for ultimate discharge onto the picker table.

In order that the principles involved in the machine of the present invention might be better understood, a brief dissertation will be given on these principles preliminary to a description of the machine and its operation.

The machine is designed to produce several hundred pounds of cut beans an hour, with the ends and undesirable sections removed by the machine itself with ample time, subsequent to cutting for manual selection or separation.

The green beans, irrespective of length but of good quality, are first deposited into a large rotating drum having in a dispersed relationship therewith expansible and retractile needles actuated exteriorly but interiorly effective to impale a limited number of the beans and elevate the same to a point above an endless conveyor where the needles are retracted to release the beans. Intermediate the point of release of the beans and the conveyor, there is provided a distributor which first receives the beans to align and to arrange them in transverse relation to the direction of travel of the conveyor.

The conveyor transports the beans so aligned and assembled to and under the first of two banks of knives and guards, the first bank being effective to cut off one end only of the bean. The conveyor is possessed of means for forcing the beans under the knives and the position of the guard in relation to the knife carried by an adjacent interlocked guard determines whether or not the bean will be cut, since it is the body of the bean itself acting on a guard which moves the knife out of cutting range. If the end of the bean escapes a guard, the next adjacent knife will remain stationary and the length of cut is determined by the distance between this stationary knife and the next adjacent guard, usually about one-fourth to one-half inch.

Further travel of the conveyor will bring the then snipped bean to the companion knife bank arranged parallel to the first but whose knives might be said to be right hand as against the left hand knives of the first bank. Due to the interlocked relationship of the knife guards and the interpositioning of guardless knives in the right hand or second bank, at predeterminately spaced intervals, not only will the opposite end of the bean be severed but the bean itself will be cut into sections by the guardless knives, depending in length upon the spacing of the latter knives.

Having thus been snipped and sectionized, the beans are discharged into a pair of parallel, rotating cylinders having holes therein. The thickness of the walls of the cylinders is a desideratum for proper preselection as to lengths of sections, effective in conjunction with plates spaced away from the peripheries of the cylinders and which release only those sections short enough to pass through the openings and the space between the cylinder and plates.

When thus sifted, hand operators dispose of undesirable sections and other matter as the mass is transported slowly along the picker table to a point of disposal.

Continuing with a more detailed description of the drawings, reference is primarily made to Figure 1 wherein is shown the frame 1 of the machine supported on a base portion 2. Mounted for rotation on the base portion is a drum or cylinder 3.

A motor 4 is mounted in the base portion and drives a wheel 5 by means of a belt 6, the wheel rotating shaft 7, which in turn drives the miter gears 8 and 9 to rotate shaft 10. Carried on the opposite end of shaft 10 is a sprocket wheel 11, over which is passed a chain 12 to encircle a sprocket wheel 13 on a stub shaft 14, mounted by a boss 15 on the end of drum 3. This arrangement drives the drum at a predetermined rate of speed and in order that the chain 12 may be kept under proper tension, an idler sprocket 16 engages one lead of the chain and is supported on the lever arm 17.

Referring now specifically to the construction of drum 3, it will be noted that the same is supported for rotation upon rubber surfaced rollers 18, the rear end being supported by the shaft 14, which is journaled in a bearing 19, the latter, in turn, being mounted in the rear frame 20.

It has been stated that the drum receives, elevates and deposits the beans onto a distributor, to be later described, which arranges the beans and drops them onto the conveyor belt. The beans are deposited into a receptacle 21 (Figure 1) at one side of the machine and from this receptacle, the beans are pushed into the drum 3.

The drum 3 is provided with a series of relatively parallel tubes 22 in relatively spaced relationship and extending in sections around the circumference of said drum. It will be noted, however, that the terminals of these tubes are staggered or in dispersed relationship as at a, b and c in Figure 1. The tubes are soldered, welded or otherwise secured to the drum surface.

Within each of the tubes, which are also referred to as needle sheaths, is disposed a steel wire 23, (Figure 5) such as piano wire and the end of each is sharpened to a needle point. As the ends of each group of tubes approach the lower point as the drum 3 rotates, sharpened needle points inside of the drum are brought into contact with the beans tumbling in the lower part of the drum which are impaled thereon or wedged therebetween and carried upward to a point immediately above the rotating axis of the drum where the wires are retracted, releasing the beans which fall onto the distributor.

The means effecting extension and retraction of the needles is shown in Figures 1, 3 and 4, and is comprised of bars 24 arranged longitudinally on the drum 3 but circumferentially spaced thereon. Each bar is slidable laterally, that is to say, relative to the direction of rotation of the drum 3. A pair of springs 25 functions to hold the bar against movement in one direction. To each bar 24 is secured by means of bolts 26, the exterior ends of the wires 23 of each group and the tendency of springs 25 is to retain the wires in extended positions.

In order to operate the wires in timed relation to the speed of drum 3, a gear rack 27 is disposed on either end of each bar 24 and a pinion 28 mounted on either end of a shaft 29 enmeshes the teeth of these racks and upon rotation of the shaft, the bars 24 are laterally moved against the resistance of springs 25 to retract the needles 23.

The timing and actuating mechanism is comprised of an arm or cam 30, (Figure 4) mounted on one extreme end of each shaft 29 and as the drum 3 rotates, this arm is dragged over a rubber roller 31, mounted upon an arm 32, (Figure 1) and carrying an attendant extension 33. This action manifestly performs the described function of actuating the needles.

The specific construction and operation of the bean conveyor will now be described. This conveyor is made up of a multiplicity of metal plates 34 (Figures 9, 12 and 15). These plates are mounted in slots cut transversely across channel members 35 and have relative spacings of approximately five-sixteenths of an inch. It is of particular importance to note that these plates are arranged in rows, one behind the other and that there is a space S (Figure 15) between the plates of each row of about one-eighth inch. This space accommodates the tag or stem end of a bean in the manner and for the purpose to be hereinafter described.

The channel members 35 are in turn mounted on other channel members 36 of smaller dimensions. The peculiar construction of the plates 34 provides for recesses 36a (Figure 15) underneath and near each end, to lie below the plane of the channel 35 and between the flanges of this and the companion channel 36. These recesses accommodate heavy gauge wires or rods 37 which lock the plates to their mountings insofar as each row is concerned. Bolts 38 (Figure 12) secure the channel members 35 and 36 together at their ends.

Sprocket chains 39 (Figures 9 and 15) are provided and to these chains the ends of each conveyor unit described, are connected in the relationship shown. Secured to every fourth unit is an arm 40 (Figure 12), the latter overlying an adjacent unit, thereby preventing upward displacement of the units by cutting resistance of the beans and to insure against any enlargement of the fixed spaces S between the plates 34.

In Figure 15 is shown the manner in which the plates 34 push the beans into cutting range of the knives, which latter will also be identified and described later. The plates each have upwardly extending and integral protuberances 41 and slightly inclined upper carrying surfaces 41a, nest adjacent to the low ends of the row of plates of the preceding unit and between these points the space S is provided. These protuberances are effective in urging the beans forward toward and under the banks of knives and guards.

The means for driving the belt conveyor just described is comprised of a sprocket wheel 42, partially shown in Figure 9, mounted on shaft 43. This shaft is driven by the motor 6 through shaft 7, chain 44 (Figure 6) and sprocket 45 (Figure 9). The conveyor extends into the drum 3 and surrounds a sprocket 46 which is an idler sprocket and mounted on shaft 47. The lower lead of the conveyor is supported on channels 48 (Figure 6). The upper lead is supported upon suitable rails of the upper part 49 of the frame 1 and travels to the left in Figure 9.

Referring now to the mechanism for receiving the beans released by the drum needles 23 and distributing the same onto the conveyor, it is mentioned that the peculiar manner of dispersal of the beans by the needles, together with the timed reciprocation of the distributor, the desired arrangement of the beans, three at a time in end to end relationship on each row of plates, is obtained. This arrangement, while alterable, has been found in practice to give the best results.

The distributor is comprised of a receiver 50 (Figures 8 and 9) which has a series of relatively spaced, inverted U-shaped channels 51, of a length equalling the width of the conveyor and these channels lie wholly in the drum 3 and are mounted to operate above the stationary frame 49 and to extend transversely across the conveyor. The space or trench 52 between each channel 51 and the width of channel 51 itself, together comprise a width corresponding to that of each conveyor unit. Trench 52 is opened and closed in predetermined, timed relation to the travel of the conveyor by a reciprocable plate or shaker 53, having shutters 54 thereon of a width equal to that of the spaces 52 between channels 51. It will be observed that the inverted channels 51 are of alternately different heights.

The members 50, carrying channels 51 and the plate or shaker 53 are reciprocable in the same plane but the speed of movement of the latter is not always consistent with that of member 50. This differential in speed allows the shutters 54 to move relative to the trench-like openings 52 to open and close the same in timed relation to the travel of the conveyor.

This movement of the shaker assembly causes a momentary pause in the fall of the bean from the needles 23 during which the walls of the inverted channel members 51 cause the beans to assume a right angle relationship to the plates of the conveyor belt and the timing of the shutters 54 causes the bean to fall between the protuberances 41 of the plates of the conveyor to a position for conveyance toward the cutting knives. The difference in height of channel members 51 prevents beans from becoming balanced atop or across these members and insures passage thereof down into the spaces therebetween.

The means by which the shaker or distributor assembly, just described, is actuated is shown chiefly in Figure 9 and consists of a bell crank 55, pivoted at A to an arm 56, which latter has its opposite end pivoted at B to the shutter assembly 53. A hollow shaft 57 is mounted for longitudinal sliding movement in bearings 58 secured to the frame portion 49 and a block 59 is secured to this shaft and provided with a flange 60, to which a pitman arm 61 is pivoted at C. The opposite end of the pitman arm 61 is pivoted at D to a collar 62, mounted on the conveyor drive shaft 43.

The block 59, secured by means of set screws 63 to shaft 57, has a depending projection 64 and to this projection the bell crank 55 is pivoted at E. The shaft 57 has connected thereto a vertical arm 65, whose upper end is affixed by means of bolts 66 to the upper distributor member 50, as shown in Figures 8 and 9.

Immediately below the bell crank 55 is a bracket 67, on which is mounted a cam guide 68. An arm 69 lies against this guide, is pivoted at F to the frame portion 49 and has an integral lug 70 disposed on an inclined plane relative to the longitudinal axis of the arm 69 and which lug lies in the path of a roller 71 carried by the bell crank 55.

The above mechanism as shown in Figure 9 is in one extreme position, that of the beginning of the opening cycle of the distributing members 50 to 54. As the wheel 45 continues to rotate, the pitman arm 61 will retract the block 59 and cause the bell crank 55 to rotate on its pivot E, which will exert a pull upon arm 56 to cause the shutter plate 53 to move and displace shutters 54 from their positions closing the openings 52.

Simultaneous with the above operation, shaft 57, due to its connection with the distributor 50 through arm 65, moves the distributor in the same direction as the shutter plate is moved but more slowly as the speed of travel of the shutter is increased momentarily due to the passage of the cam roller 71 over the lug 70. This momentary increase in speed of the shutter plate 53 is so timed that the trenches 52 will be alined with the conveyor units when the shutters are actuated to release beans from these trenches. Likewise, by a continuation of the forward movement, the cam roller is brought in contact with the descending surface of cam guide 63 and the shutters 54 are returned to their original position directly below and closing trenches 52 as cam roller 71 reaches the extreme of the forward travel. At this point, the depositing of the bean in trenches 52 is effected. Upon further rotation of the wheel 45, the bell crank travels in the opposite direction in an inoperative relationship to distributor 50. The cam roller 71, traveling in a straight line and passing under inclined lug 70 as cam roller 71 reaches the end of the rearward thrust, lug 70 again falls into its original position and the cycle of action is completed. The interval of time between the depositing of the bean at the beginning of the rearward thrust of assembly 50 and the beginning of the next forward thrust constitutes the momentary pause in the fall of the bean that allows it to align itself in the trenches 52.

Referring now specifically to the cutting and slicing units, it has been stated that two banks of knives and guards are provided, the banks being relatively parallel and disposed transversely across the conveyor belt. Each bank is supported in a mounting comprised of L-shaped members 72 and 73, the former carrying the knives and guards adapted to sever one end only and the latter supporting the knives and guards as well as guardless knives for cutting off the remaining end of the bean and sectionizing the same.

An example of the right hand knife and guard construction is shown in Figure 16, and an interlocked assembly thereof shown in Figures 17 to 19 inclusive. The unit is comprised of a knife 74 having a tail portion 75 which is connected to or integral with a guard 76, it being observed that the two elements can be stamped out of one piece of metal. The left hand knife and guard are the same except that the guard, instead of being disposed to the right of the knife, is disposed on the left hand side thereof as shown in the assembled arrangement in Figure 13.

In the machine of the applicant's earlier patent herein identified, difficulty was had in effecting maximum cutting efficiency of the knives since about 20% escaped the cutting action entirely, due to a space left between the knives and the juxtapositioned plates corresponding to the plates 34 of the conveyor assembly of the present machine. This defect has been overcome entirely by the present cutting assembly by providing the knife 74, with its inclined cutting edge e (Figure 16) with the guard 76 whose skirt is curved outward from the knife and extends below the lowest point of the knife. The construction is such that the knife of one unit will be located in the space between the knife and guard of one of the other units, as clearly illustrated in Figures 13 and 14.

In Figure 13, showing the left hand bank or the assembly for cutting off only one end of the bean, it is to be noted that the view is taken as looking from the left of Figure 9 or from the front of the machine, it being remembered that this bank of knives is the second from the left in Figure 9 and the first to be encountered by the beans.

As the bean 77 is pushed forward by the protuberances 41 of the plates 34 of the conveyor, it contacts the curved parts of the guards which in the present case is identified by the reference character 78 (Figure 13) since it is the left hand bank being referred to. The bean will thus cause all of the guards 78 to be raised and the knives 79 of each guard will also be raised and kept out of operative cutting range of the bean. On the other hand, if the end of the bean 77 extends past the vertical plane of the cutting edge but not far enough to contact the guard 78 associated therewith, then the knife will not be raised but will remain in operating position, as clearly shown in Figure 13, and the bean will be pushed into contact with the cutting edge of the knife which will snip off as much of the bean's length as may extend beyond its vertical plane. The amount snipped off will vary from, say, $\frac{1}{32}''$ to $\frac{5}{16}''$.

It will be observed that in Figure 13, the tag or stem of the bean 77 and identified by reference numeral 80 is shown as having been pressed by guard 78 down into the space S (Figure 15) between the plates 34 and is therefore ineffective to raise a guard and knife unit. Moreover, it will be noted that wires 81 lying between each plate 34 and across the tops of the channels 35, are connected at 82 (Figure 12) and extend the full length of travel of the upper lead of the conveyor assembly. The highest plane of these wires is provided by bends A' (Figure 12) and are disposed at the rear of the conveyor. The beans fall onto the wires from the distributor and at this point are on a level above the plate surfaces 41a. The beans receive their initial assembling action by engagement therewith of the portions 41 of plates 34. Moreover, these wires prevent any matter from dropping between the rows of units and determines the depth to which the stems of the beans may be depressed into spaces S.

The right hand knife and guard bank or the second bank encountered by the beans is illustrated in Figure 14 in operative assembly. The principle of this arrangement is the same as in the preceding instance but at spaced intervals throughout the bank, a knife 83 is interposed. The construction of this knife is shown in Figure 11.

The knives with their guards in each bank are mounted for pivotal movement on a rod 84 extending from one end to the other of each mounting 72 and 73. Springs 85, mounted in apertures 86 of each knife and guard and having their opposite ends connected to the top of the vertical flange of the mountings 72—73 are effective for holding the units down in operative position, to be raised by a bean resisting the tension of said springs (Figure 9). The tension of these springs may be adjusted as desired.

Returning to Figure 14, the bean 77 is shown being snipped as well as cut into sections. The snipping operation is the same as when its opposite end was severed, but since the cutting knives 83 have not guards they remain in cutting position, hence the sectional cutting of the bean. It is apparent that it would not matter where the bean entered the cutting range of the assembly, except for a possible slight variance in the length of the separated part, nor would it matter in which direction the ends of the bean were disposed, the operation would be identically the same.

The foregoing explains the construction and operation of the elements of the machine from the beginning to the point of discharge. At this point, however, a sifting mechanism is provided for separating the bean sections from the severed ends. Such mechanism is shown in Figures 20 to 25, inclusive, and the mounting therefore shown in Figure 10.

This sifting means is comprised of a pair of cylinders 87, mounted for rotation in the same direction on rollers 88 (Figure 10). This assembly is, of course, at the delivery or front end of the machine and the cylinders 87 are inclined, the highest ends being in register with openings 89 in a plate 90 and through which the cut and snipped beans are discharged by the conveyor, to be received by the cylinders.

The driving mechanism for these cylinders is through a shaft 91, extending outside of frame 1 and carries a sprocket wheel 92 (Figure 1) with a chain 93 surrounding this as well as another sprocket wheel 94, mounted on shaft 43.

The shaft 91 carries spiral gears 95 (Figure 10) which enmesh similar gears 96 mounted on parallel shafts 97, each carrying a pair of the rollers 88, spaced apart. The centrally disposed rollers 98 support the cylinders 87 at the central portion of the mounting. Thus it will be seen that the mass, as it is deposited into the cylinder 87 is agitated by rotation and precipitates by gravity toward the lower ends of the cylinders to be deposited upon the picking table, to be presently described, comparatively free of bean ends and the like, which fall into a suitable receptacle below the cylinders.

It will be understood that the sifters need not of necessity, be cylindrical. They may be square or of any other desired shape but the principle is the same. This provides that the walls of the cylinders be of a definite thickness, depending upon the length of the section of bean retained or rejected.

In the present case, the walls of the cylinders are approximately one-half inch in thickness with holes 99 (Figures 20-23) each being recessed or countersunk at 100. This is for the purpose of assisting entrance of the bean sections into the holes.

Complementary to these holes is a plurality of plates 101, curved axially to collectively conform to the circumference of the drums. These plates are hinged along one edge by pintles 102, to end flanges 103 of the cylinders, while their opposite edges are capable of movement relative to the surfaces of the cylinders, and are held away from the cylinder surface by springs 101a. This arrangement is shown in Figures 21 and 23 in detail. The movable edges are limited in their displacement by pins 104 operating in short slots 105, also in the flange 103.

Adjacent the upper ends of the cylinders 87, a flexible belt 106 surrounds each of the cylinders, whose function is to hold the plates 101 down toward their respective cylinders until their upper ends engage the pins 107 (Figure 20), whereupon the movable edges of the plates are lifted, aided by springs 101a, as shown in Figure 21. This occurs at a fixed point in the rotary path of the plates as the cylinders rotate and the action is effective to return sections of beans, which might be lodged in the manner shown in Figure 23, back into the cylinder for discharge at its end, while the same operation releases all ends or pieces small enough to pass entirely through the holes to enter the spaces between the plates 101 and the cylinders. By so lifting the plates at intervals, there is no clogging of apertures or escape spaces for ends and due to the hole dimensions and spacings, only the portions of beans of undesired length will escape the cylinders, the others will report on the traveling picker belt for hand sorting.

In order to predetermine the length of bean sections retained or rejected, the plates 101 are arranged for relative axial adjustment to vary the distance between the plates and cylinder surfaces. This arrangement is shown in Figure 25 in detail, and consists of flanging the inner contiguous ends of each plate at 108, midway between the ends of the cylinders. The flanges 108 are slotted at 109 and bolts 110 serve to secure the flanges together after the desired adjustment of the spaces 111 between the plate and cylinders has been made. The space throughout the length of the cylinders may be the same but with this adjustment, the upper portion of the cylinders may allow escape of particles of a different length than those passing downward toward the lower ends of the cylinders.

When the beans ends have been separated in the manner explained, from the sections, the latter fall upon the endless belt 112 of the picker table 113. This picker table may, obviously, be any desired length but a section has been removed in the drawings to shorten the same.

The belt 112 surrounds an idle roller 114 (Figure 6) in the frame 1 of the machine, over a tension roller 115 and around a drive roller 116 at the front of the picking table. Another tension roller 117 is similarly mounted adjacent roller 116.

The roller 116 is driven by means of a shaft 118 underneath the picker table and carries a sprocket wheel 19 (Figure 2) thereon. A chain 120 surrounds this sprocket and a similar sprocket 121 on shaft 10, which, as stated earlier in the specification, drives the drum 3. The opposite end of shaft 118 carries a beveled gear 122, enmeshing a similar gear 123 (Figure 1) mounted on a short shaft 124. This shaft carries a sprocket wheel 125 and a chain 126 surrounds this and a larger sprocket wheel 127. A universal joint 128 is provided in the length of shaft 118 for flexibility.

It will be noted particularly in Figure 7 that the edges 129 of the picker table are so constructed as to overhang the belt 112 as a protection against injury to the fingers, while allowing a small space 130 for the escape of all particles smaller than bean sections. The picker table is supported front and rear by legs 131.

Since the preliminary dissertation in the first part of the specification sets forth the operation of the machine briefly, it is believed that this, together with the operation of parts throughout the body of the specification will suffice to afford a complete understanding of the operation of the machine.

Manifestly, the construction as shown and described is capable of some modification and such modification as may be construed to fall within the scope and meaning of the appended claims is also considered to be within the spirit and intent of the invention.

What is claimed is:

1. Apparatus for snipping and slicing legumes including a frame, a conveyor belt comprised of transverse rows of plates relatively arranged to define intermediate spaces in longitudinal and transverse relation to the direction of travel of said belt, a bank of yieldable snipping knives disposed transversely across said belt having inclined cutting edges and lying in the horizontal spaces between said plates to sever one end of said legumes, integral, interrelated guard means carried by said knives effective to predetermine the limit of the severed length of the legumes passing under said knives and to depress tag ends of said legumes into said lateral spaces for severance, a companion bank of analogously interrelated knife and guard units forwardly of said first bank for removing opposite ends of said legumes, guardless knives at predeterminately spaced intervals between the units of said latter bank for slicing the legumes into sections simultaneously with the final snipping action thereof, means for elevating and depositing legumes onto said conveyor belt for subjection to said snipping and slicing action and means disposed longitudinally of said conveyor belt intermediate said rows of plates and collectively elevated at the receiving end of said conveyor to initially assemble said legumes and limit the depth of depression of said legume tag ends.

2. Apparatus for severing the ends from and sectionizing legumes including a frame and an endless belt conveyor comprised of a multiplicity of plates in longitudinally and transversely spaced relation to the direction of travel of said belt, said plates having aligned upwardly extending protuberances as guide means for said legumes and relatively spaced longitudinally and transversely, a series of relatively spaced spring retained knives normally lying in the longitudinal spaces between said plates having cutting edges in angular relation to their shanks, arcuate guards carried thereby to be elevated by a legume to expose a length of its end portion to an adjacent knife for severance thereof, said guards likewise effective to depress into said transverse spaces the tag end of said legumes for severance, a second series of knives in parallel relation to said first series, having interlocking guards whose relation to their knives is reverse to that of said first knife and guard units to sever the opposite ends of said legumes and for limiting the length of end sections of legumes simultaneously severed by said knives, means for elevating and depositing legumes onto said belt, means longitudinally disposed between said conveyor plates for initially orienting said legumes and means for separating sections of legumes from the severed tips subsequent to their subjection to the action of said knives.

3. A machine for snipping and cutting legumes including an endless conveyor comprised of relatively spaced rows of plates in side to side relationship to define spaces between said rows and plates of a width less than that of a legume, a drum arranged to revolve about the receiving end of said conveyor, sheathed wires longitudinally spaced on the outer surface of said drum having sharpened ends extending through the latter, means for longitudinally actuating the wires in their sheaths to extend and retract the same at predetermined intervals during the rotation of said drum thereby to impale and wedge legumes in the bottom of said drum and release the same in the top thereof, cooperating means reciprocably disposed between said conveyor and drum for receiving, assembling and depositing legumes onto said conveyor, rows of knives carrying guards disposed in the spaces between the plates of said conveyor operative to sever the ends of said legumes and to sectionize the same, said guards being likewise effective to depress the tag ends of said legumes into the spaces between said rows of plates to expose the meat portions of said legumes to the action of said knives, and means for separating the severed legumes from the sections thereof.

4. Apparatus of the character set forth for snipping and slicing legumes, separate banks of snipping and clicing knives and guiding means cooperatively associated, a conveyor comprised of rows of relatively pivoted plates in spaced relationship both longitudinally and transversely with respect to the travel of said legumes, with spaces of predetermined width intermediate the rows of plates, guards carried by one complete row of knives and disposed on one side only of said knives and lying in spaces intermediate said plates whereby to be elevated upon contact therewith of the body of a legume, one end of the latter being severed by an adjacent knife whose guard escapes the lifting action of said legume, the companion row of snipping and slicing knives being spaced forwardly of said first row having interlocking guards, knives interposed between groups of said guard bearing knives and devoid of guards whereby the unsevered opposite tip of a legume will be removed thereby and the legume simultaneously severed into sections through the action of said legume on the guards of adjacent knives, means for elevating and depositing legumes for reception by said conveyor and longitudinal wires interposed between said conveyor plates and collectively elevated at the point of discharge by said elevating means for initially orienting said legumes preparatory to the action thereon by said knives.

5. In an apparatus for snipping and sectionizing string beans, parallel sets of snipping and sectionizing units, each being pivoted at one end and provided adjacent the opposite end with an angular knife, a guard integral and cooperating with said knife, the lower portion of which extends below the cutting edge of said knife, the said units being so arranged that the knife of one unit will be located in the space between the knife and guard of one of the adjacent units, means for conveying said beans under said knives of one set with their length at right angles to the cutting edge thereof and into contact with a plurality of said guards whereby all of the guards contacted by a bean will be elevated thereby to move their associated knives out of cutting range with the said bean to sever one tip only of the group of beans urged thereunder, a series of guardless knives interposed at predeterminately spaced intervals between guard carrying knives of the companion set to effect severance of the remaining tips of said beans and for sectionizing the same simultaneously, means for transporting said beans for reception by said conveying means and means initially receiving and orienting said beans preparatory to action thereon by said knives.

6. In a machine for snipping and slicing legumes, a parallel series of cutting knives, a guard integral with each knife of one series and extending below the lowest part of its knife, an endless belt conveyor for transporting legumes under the knives and guards, the said conveyor having transverse recesses of sufficient width to accommodate only a stem or tag end of a bean whereby the latter will be forced by a guard down into a transverse recess thereby exposing the bean proper to the action of the knife next adjacent the end of said bean to sever the same, a plurality of guardless knives interposed between the guard carrying knives of the companion series, operative to simultaneously sever the opposite end of said bean and slice the latter in sections of predetermined uniform length.

7. In a bean snipping and cutting machine, a bean conveying and cutting assembly comprising bean carrier plates having integral, upwardly extending protuberances, a bank of yieldingly pivoted knives extending laterally across said conveyor and having cutting edges inclined toward the direction of travel of said bean and intersecting the plane thereof, a guard carried by each of said knives and curved laterally with respect thereto and downwardly to intersect the path of said bean, the guard of one knife being interposed between the knife and guard of the next adjacent unit and effective to lift its knife out of cutting position only when engaged by a bean passing thereunder, the said protuberance of said carrier plate forming with the inclined edge of an operative knife, a diminishing, substantially triangular cutting area to sever one end only of a bean as said bean is conveyed under said knife, a second bank of analogously related knives and guards, a plurality of guardless knives interposed at spaced intervals between groups of guard carrying knives, operative to cut said beans in sections of predetermined uniform lengths simultaneously with the severance by said latter knives of the remaining ends of said beans, and means for initially orienting said beans preparatory to action thereon by said knives and guards.

8. In a bean snipping and cutting machine, a bean conveyor operating on a horizontal plane for transporting beans in end to end and in dispersed relationship, a series of knife and integral guard units assembled in a row with the cutting edge of the knives inclined downwardly toward the plane of travel of said beans, the guard of one unit being offset to lie between the knife and guard of a contiguous unit and effective to lift its knife out of cutting range of a bean only when engaged by said bean, spring means resisting said lifting action, relatively pivoted plates having receiving surfaces for said beans and provided with integral means successively passing through the spaces between the knife of one unit and the guard of a contiguous unit to push a bean against the cutting edge of an effective knife, the said edge, receiving surface and pushing means of said plates conjointly forming a diminishing, substantially triangular cutting area as said conveyor is operated, a plurality of knives without guards interposed between guard carrying knives at predeterminately spaced intervals to simultaneously sever the ends of and sectionally slice said beans.

CHAUCER G. JOHN.